June 10, 1924.
D. C. KLAUSMEYER
1,497,569
INTERLOCKING CONTROL FOR CHANGE GEARS
Filed Aug. 25, 1920  2 Sheets-Sheet 1
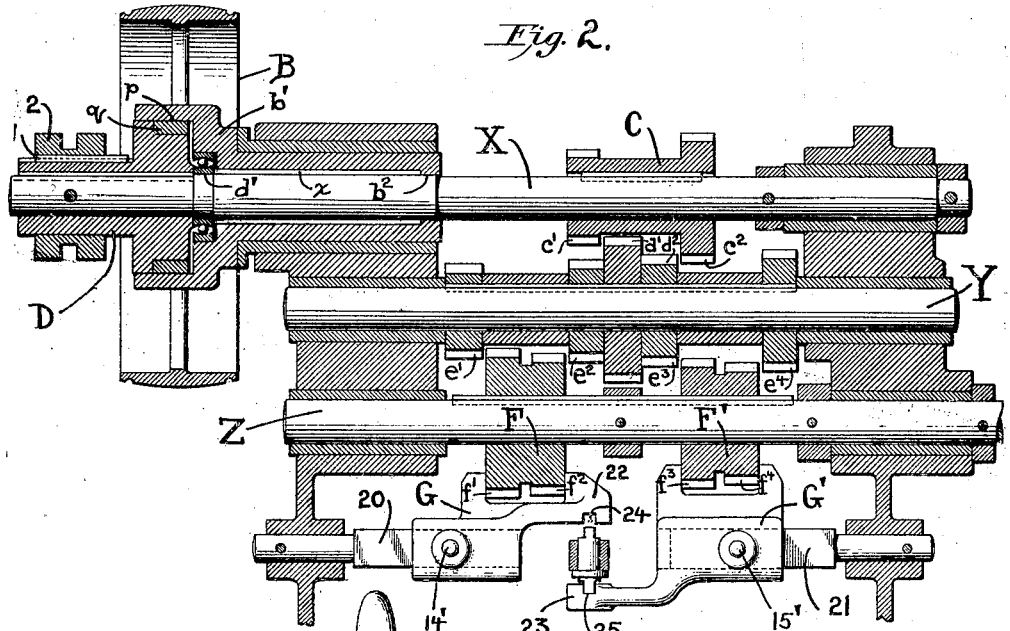
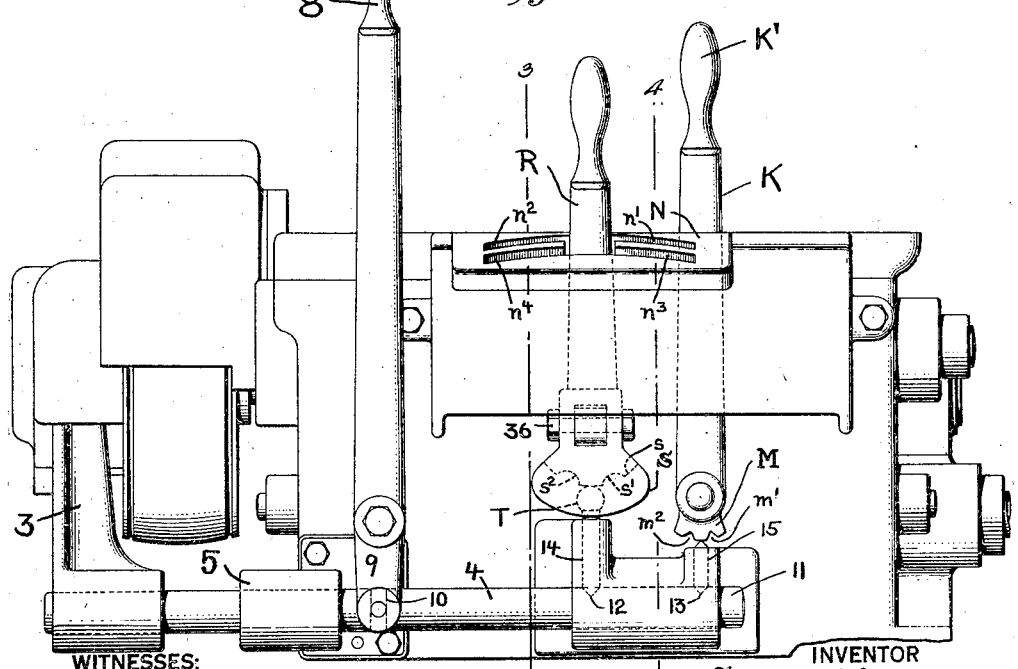
WITNESSES:
L. E. Fischer
INVENTOR
David C. Klausmeyer
BY Albert F. Nathan
ATTORNEY June 10, 1924.
D. C. KLAUSMEYER
INTERLOCKING CONTROL FOR CHANGE GEARS
Filed Aug. 25, 1920   2 Sheets-Sheet 2
1,497,569
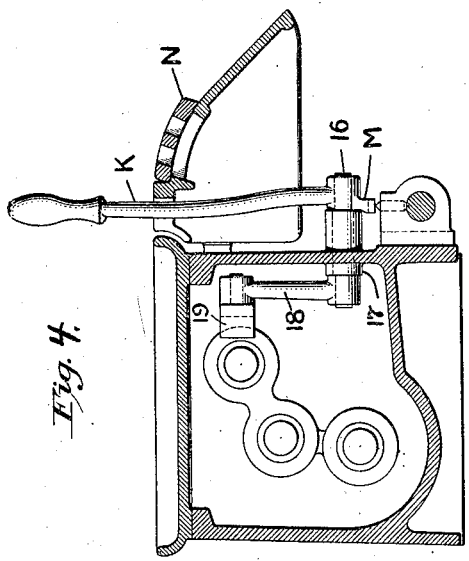
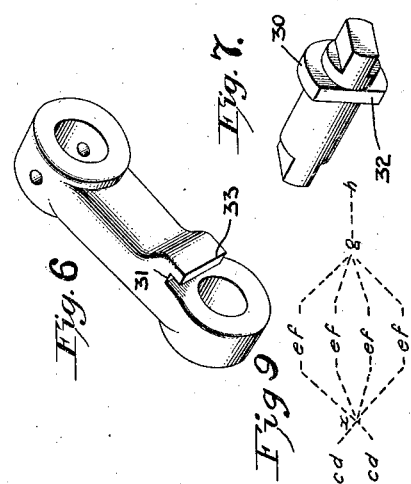
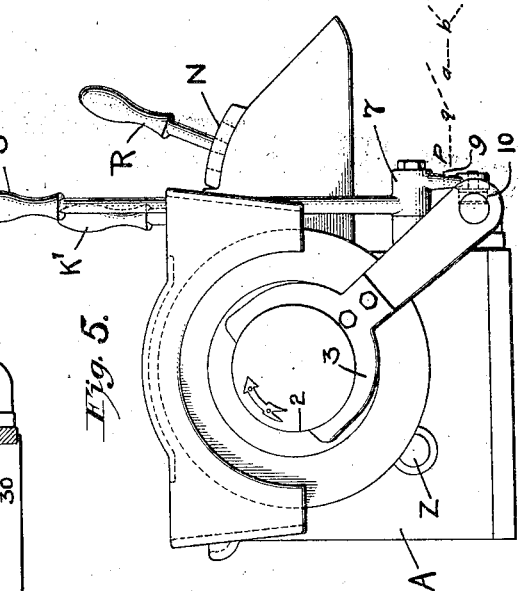
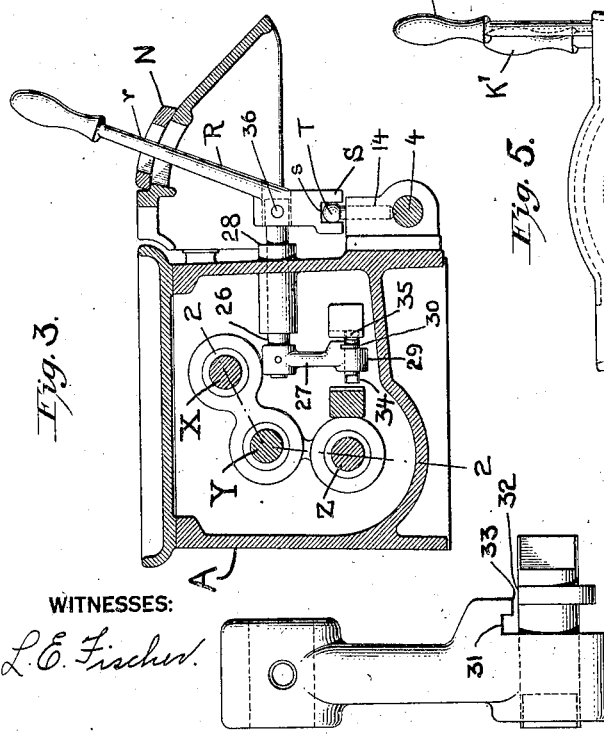
WITNESSES:
L. E. Fischer
INVENTOR
David C. Klausmeyer
BY Albert F. Nathan
ATTORNEY Patented June 10, 1924.

1,497,569

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

INTERLOCKING CONTROL FOR CHANGE GEARS.

Application filed August 25, 1920. Serial No. 406,009.

*To all whom it may concern:*

Be it known that I, DAVID C. KLAUSMEYER, a citizen of the United States, and residing at Cincinnati, in the county of Hamilton and State of Ohio, have invented a new and Improved Interlocking Control for Change Gears, of which the following specification is a full disclosure.

This invention relates to so-called changegears wherein different gear ratios are brought into serial relation to yield any one of a predetermined number of speeds.

One of the objects of this invention is to so arrange a manually operated lever system as to prevent the gears from being shifted into incompatible positions.

Another object is to render available a simple yet effective lever control system so devised that the gears cannot be shifted and brought forcibly into a new engagement unless they have been disconnected from the source of power; thereby avoiding a breakage of teeth.

Another object is to devise a speed-way system of a very simple, compact nature appropriate for various types of machine tools and especially for power drills.

Other objects and advantages will be in part indicated in the following description and in part rendered apparent therefrom in connection with the annexed drawings.

To enable others skilled in the art to so fully apprehend the underlying features hereof that they may embody the same in the various ways contemplated by this invention, drawings depicting a preferred typical construction have been annexed as a part of this disclosure, and in such drawings like characters of reference denote corresponding parts throughout all the views, of which:—

Fig. 1 is a side elevation of a gear box embodying this invention. Fig. 2 is a development along line 2—2 of Fig. 3 showing the relations between the respective gears and illustrating certain details of the gear shaft instrumentality. Fig. 3 is a section through line 3—3 of Fig. 1. Fig. 4 is a section through line 4—4 of Fig. 1. Fig. 5 is an end view of the assembled gear box shown by Fig. 1. Figs. 6 and 7 are perspectives of the lever arm and pin for establishing an interlock in the gear shifter. Fig. 8 is a side elevation of the lever arm and pin shown in Figs. 6 and 7, showing them partly assembled. Fig. 9 is a diagrammatic representation of the flow of motion in this feedchange mechanism.

Turning now to Fig. 9, the scheme of transmission will be understood. The power is transmitted from $p$, the prime-mover, along the main-line transmission $p$—$a$—$b$ to the junction $b$ where it takes either branchline $b$—$c$ or $b$—$c'$, depending upon whether the clutch (which in this case assumes the form of a shifting gear) establishes connection between the terminals $c$ and $d$ or the terminals $c'$ and $d'$. The power then is transmitted from $d$ or $d'$ (as the case may be) to either of the terminals $e, e', e''$ or $e'''$, depending upon which of the gaps $e$—$f$, $e'$—$f'$, $e''$—$f''$ or $e'''$—$f'''$ are closed by an appropriate clutch-operation, such, for example, as a gear-shift. From such terminals, the power is transmitted to $g$ and then to $h$ where it is utilized. This arrangement affords two gear ratios $b$—$c$—$d$—$x$ and $b'$—$c'$—$d'$—$x$ either of which may be arranged in series with any one of the four different gear ratios $x$—$e$—$f$—$g$, $x'$—$e'$—$f'$—$g$, etc.; thereby yielding eight different speeds. Since the branch-line transmissions have different individual ratios, it will be seen that not more than one of the gaps $c$—$d$ and $c'$—$d'$ may be closed simultaneously, and likewise but one of the gaps $e$—$f$, $e'$—$f'$, etc., may be closed during the same period. Furthermore, the general system should not be transmitting power (i. e. gap $g$—$a$ should be open) when the clutch-operations are being performed otherwise parts would be injured. Hence, in the structural embodiment of this scheme, a novel interlocking instrumentality is resorted to to safeguard against this contingency. This will now be explained in detail.

Referring now to Fig. 1, a suitable casing A provides journals for a power shaft X, an intermediate shaft Y and a delivery shaft Z. Shiftably splined to the shaft X is a gear couplet C providing two gears $c^1$ and $c^2$. Keyed to the intermediate shaft Y are two gears $d^1$ and $d^2$ ratioed differently and adapted to be brought into mesh with the aforesaid gears $c^1$ and $c^2$; there being on this shaft also gears $e^1$, $e^2$, $e^3$ and $e^4$. On the delivery shaft Z there are two shiftable gear couplets F and F' providing gears $f^1$, $f^2$, $f^3$ and $f^4$ which, by a shifting of the appropriate gear couplet, F or F' may be brought into mesh with the respective one of the four above-mentioned gears. These gears are differently ratioed so that this arrangement provides eight different ratios between the driving and the driven shaft.

A prime-mover, here instanced as a pulley B, is arranged adjacent the shaft X and may be connected therewith by means of a suitable clutch, such as the friction clutch D, which provides an expansible shoe $q$ adapted to be forced into an engagement with the surface $p$ of the pulley B, by the wedge-action of a taper bar 1 controlled in position by the shiftable collar 2. A construction suitable for this purpose is exemplified, for example, by the patent to Norris No. 1,030,424.

The position of the shiftable collar 2 is determined by means of a yoke 3 (see Figs. 1 and 5) secured to a rod 4 which translates in bearings 5 and 6 and is actuated by means of a lever 7 having an operating handle 8 and terminating in an arm 9 having a suitable connection with the rod 4 as, for example, by means of the tongue and groove connection 10. The rod 4 has a portion 11 extending into the bearing 6 and provided with two notches 12 and 13 into which the wedge-shaped end of two locking pins 14 and 15 may enter. It will be seen that, by virtue of the wedge-shaped extremities of the pins 14 and 15, the rod 4 can freely translate when these pins are in the notches 12 and 13 only in case there is nothing to prevent the pins 14 and 15 from freely moving longitudinally. As will subsequently appear, such longitudinal movement is prohibited under certain conditions by the levers that control the shifting of the gears. That is to say, it is only after the gear-shift levers have been moved to establish an appropriate meshing relation between the different gears, that it is possible to translate the rod 4 and connect the power with the gearing. The converse is also true that, after the rod 4 has been shifted to connect the power with the gearing, it becomes impossible to move either of the gear-shift levers and, if it be desired to change the gear ratio, the power lever 8 will have to be first restored to its inoperative position.

A single lever K controls the position of the gear couplet C. This lever (see Figs. 1 and 4) is secured to a shaft 16 journaled in a bearing 17 and having connected to its inner end an arm 18 the end of which pivotally carries a shoe 19 that rides between the gears $c^1$ and $c^2$, and determines the position of the gear couplet in accordance with the angular position of the lever K which is moved by the handled portion K'. The hub of the lever K carries a notched segment M provided with two notches $m^1$ and $m^2$ which will be in registry with the upper tapered extremity of the pin 15, when the corresponding gears $c^1$ and $c^2$ are in engagement It will be seen that, in this condition of registry, the pin 15 is free to translate, and therefore does not lock the rod 4. Likewise when the lever K is in the intermediate position shown by Fig. 1, the periphery of the segment M interferes with any translation of the pin 15, and consequently the rod 4 cannot be moved. So also, whenever the power is on, the pin 15 will be seated in either one or the other of the notches $m^1$ and $m^2$ and therefore it is necessary to move the rod 4 until the pin 15 can enter the notch 13 before it is possible to swing the lever K.

A single lever has also been devised and arranged so as to enable it to move either one or the other (but not both simultaneously) of the gear couplets F and F' into the appropriate tooth engagement. This is achieved as follows: From the right and the left side of the casing A project two square studs 20 and 21 and on these ride the yokes or gear shifters G and G'. These yokes embrace the ends of the gear couplets F and F', respectively, thereby enabling the gears to be located close together. These yokes are impositively retained in either one of their two operative, or in their inoperative, positions by means of spring-pressed plungers 14' and 15'. These yokes are provided with oppositely extending arms 22 and 23 having vertical slots 24 and 25 which lie directly opposite or in registry whenever the yokes G and G' are in neutral position. A lever mechanism is provided which, alternately, can engage the one or the other of said slots 23 or 24 and remains in that engagement for the purpose of shifting the corresponding yoke either to the right or to the left, and continues in that engagement as a matter of necessity so long as the yoke is in any other than its neutral position. A shaft 26 extends from the outside through the wall of the casing A and at its inner end securely carries a depending arm 27. This shaft 26 is both rotatable and translatable in the bearing 28. At its lower end, the arm 27 pivotally carries a pin 29 which is restrained against translation by means of a collar 30 located within the slot 31 provided by the depending arm 27. The pin 29 is shown better by Fig. 7 and it will be seen that one side of the collar 30 is cut away at 32; which enables it to clear the edge 33, for purposes of assembling. The pin is then rotated 180°; which brings its collar 30 into the slot 31. The ends of the pin terminate in tongues 34 and 35, and the pin is of such length that, when the tongue 35 is inserted in the slot 25, its other end will entirely clear the slot 24, and conversely. It is also of such length that it cannot be moved entirely out of one slot before it begins to enter the other slot, thereby insuring that the yokes G and G' are both in neutral position when the depending arm 27 is being transferred from its operative connection with the one yoke to its operative connection with the other yoke. This transference is achieved by effecting a translation of the shaft 26 and, after that has been done, a rotation or oscillation of the shaft 26 effects a shift of the engaged yoke and establishes the desired gear intermesh. To translate and oscillate the shaft 26, a hand operated lever R is employed. This lever has no fixed pivot but has a floating pivot 36 whereby it is attached to the outer end of the shaft 26, as is shown more clearly by Figs. 1 and 3. This lever R is fulcrumed at all times about a ball T constituting the upper extremity of the shiftable pin 14. This fulcrum is maintained in all angular positions of the lever R by means of side plates S with which the lower end of the lever R is provided. Between these side plates S is a circular segment $s$ provided with two spherical seats $s^1$ and $s^2$ adapted to receive the ball T when the pin 14 has been thrust upwardly by virtue of the translation of the rod 4, as explained in connection with the pin 15. This arrangement prevents the lever R from being oscillated so as to rotate the shaft 26 when the power is on. In order to further control and assist the lever R in its various movements, its shank $r$ passes through an H-plate N which is provided with four slots $n^1$, $n^2$, $n^3$ and $n^4$ with a communicating central slot. This central slot corresponds to the neutral position of the two yokes G and G' and therefore the H-plate permits the lever R to be shifted so as to translate the shaft 26 only when the parts are in neutral position. When the lever is shifted back or forth within the plane of the slots $n^1$ and $n^2$, it is actuating the yoke G and the gear couplet F, but when it is swung in the plane of the slots $n^3$ and $n^4$, it is shifting the yoke G' and the gear couplet F'. It will therefore be apparent that the lever R can engage only one of the four gears controlled by it at any one time.

Without further analysis, the foregoing will so fully reveal the gist of this invention that others can, by applying current knowledge, readily adapt it for various utilizations wthout omitting certain features that, from the standpoint of the prior art, fairly constitute essential characteristics of the generic or specific aspects of this invention, and therefore such adaptations should be and are intended to be comprehended within the meaning and range of equivalency of the following claims.

Having thus revealed this invention, I claim as new and desire to secure the following combinations of steps and elements, or equivalents thereof, by Letters Patent of the United States:

1. A speed-change mechanism combining a first lever having a socketed portion movable therewith; an intermediate member adapted to be seated in said socketed portion and terminating at its other end in a rounded extremity; a second lever fulcrumed about said extremity and having also a socketed portion adapted to receive said extremity when said first lever is in an operative position; and power transmitting elements controlled by said levers.

2. A speed-change mechanism combining a power delivery shaft; two gear-units splined thereto; two spaced and independently mounted gear shifting yokes one of which embraces each of said gear-units; oppositely extending arms carried by said yokes and formed with opposed slots; a second shaft rotatably and translatably journaled transverse to said power delivery shaft; an arm secured to said shaft and extending between the arms on said yokes; tongues projecting at opposite sides of said arm and adapted to engage said slots; a lever pivoted transversely to said second shaft whereby the latter may be rotated and the yokes, and thereby the ear-units, translated when said lever is oscillated in a transverse plane; a fulcrum cooperating with said lever whereby it may be swung to translate said shaft and cause said tongues selectively to engage either slot; a power transmission system; a plurality of gears operatively connected with said transmission system and adapted to be engaged by said two gear-units; a clutch combined with said transmission system; clutch operating means; and an interlock between said clutch operating means and said gear shifting mechanism, to permit the latter to be operated only when the clutch is inoperative.

3. A mechanism of the nature disclosed combining a movable member having a socket; a plunger mounted adjacent said member and adapted to enter said socket, said plunger terminating at its other end in a spherical portion; a lever having side plates embracing said spherical portion whereby said lever will be fulcrumed thereby, said lever also having a segmental socketed portion locked between said side plates; and a shaft translatably and rotatably mounted to which said lever is pivoted.

4. A speed-change mechanism combining a power-shaft; an intermediate shaft; a delivery shaft; a plurality of shiftable gear-units supported by certain of said shafts; a plurality of non-shiftable gears supported by one of said shafts; an operating lever movable in a single plane for shifting one of said gear-units; a second lever movable in two substantially parallel planes and one plane transverse thereto to engage and shift others of said gear-units, it being necessary to shift both of said levers to effect a driving connection between said power shaft and said delivery shaft; segments carried by each of said levers and each providing a socket; a main clutch; an actuating lever therefor; a member movable with said clutch actuating lever and providing a plurality of sockets; pins intervening between the sockets of said segments and of said movable member whereby neither of the levers may be operated unless the pins are seated in the sockets in said movable member, one of said pins also providing a fulcrum for said second lever whereby it is given its transverse movement.

5. A speed-change unit combining a casing provided with an H-slot located on one side thereof; three levers located adjacent each other, one of said levers being arranged in said slot; two shafts extending through the wall of said casing and journaled therein, the one of said shafts being free to move axially and having its outer end pivoted to the lever located in said H-slot, and the other shaft being incapable of axial movement and being keyed to another one of said levers; a plurality of gear units adapted to be independently positioned by the single lever located in said H-slot; a gear unit in said casing adapted to be shifted by said other lever; a main clutch controlled by said third lever and an interlock between said third lever and the other two levers to prevent an actuation of either of said other two levers when said third lever is positioned to render said main-clutch inoperative.

6. A speed-change unit combining a casing provided with an H-slot located on one side thereof; three levers located adjacent each other, one of said levers being arranged in said slot; two shafts extending through the wall of said casing and journaled therein, the one of said shafts being free to move axially and having its outer end pivoted to the lever located in said H-slot, and the other shaft being incapable of axial movement and being keyed to another one of said levers; a plurality of gear units adapted to be independently positioned by the single lever located in said H-slot; a gear unit in said casing adapted to be shifted by said other lever; and an interlocking system for preventing the movement of either of the two first-mentioned levers unless the last-mentioned lever is in its neutral position.

In witness whereof, I hereunto subscribe my name, as attested by the two subscribing witnesses.

DAVID C. KLAUSMEYER.

Witnesses:
C. C. SLETE,
ANNA M. HUSSIAN.